United States Patent
Hatjopoulos et al.

(10) Patent No.: US 8,757,140 B2
(45) Date of Patent: Jun. 24, 2014

(54) BARRIER SYSTEM FOR ENHANCING THE SAFE OPERATION OF A COMMERCIAL COOKING APPLIANCE

(76) Inventors: Triandafilos Hatjopoulos, Uxbridge, MA (US); George Hatjopoulos, Blackstone, MA (US)

( * ) Notice: Subject to any disclaimer, the term of this patent is extended or adjusted under 35 U.S.C. 154(b) by 59 days.

(21) Appl. No.: 11/880,851

(22) Filed: Jul. 24, 2007

(65) Prior Publication Data
US 2009/0025705 A1 Jan. 29, 2009

(51) Int. Cl.
F24C 15/12 (2006.01)
(52) U.S. Cl.
USPC ....... 126/214 D; 126/201; 126/215; 126/218; 160/19; 160/21; 99/450; 99/422
(58) Field of Classification Search
USPC ......... 126/214 D, 201, 215, 218, 299 D, 216, 126/299 C, 38, 9, 39 C; 160/19, 21; 49/9; 99/450, 422, 427; 220/4.03, 573.1; 219/452.12, 452.11
See application file for complete search history.

(56) References Cited

U.S. PATENT DOCUMENTS

| | | | | |
|---|---|---|---|---|
| 2,568,276 | A * | 9/1951 | Eggleston | 219/452.11 |
| 2,887,154 | A | 5/1959 | Morningstar et al. | |
| 3,289,664 | A * | 12/1966 | Hewitt | 126/37 R |
| 3,319,620 | A * | 5/1967 | Nazzaro | 126/211 |
| 4,019,497 | A | 4/1977 | Koons | |
| 4,321,857 | A | 3/1982 | Best | |
| 4,589,124 | A * | 5/1986 | Ruiz | 378/178 |
| 4,836,181 | A * | 6/1989 | Saga | 126/42 |
| 5,012,071 | A | 4/1991 | Henke | |
| 5,351,673 | A * | 10/1994 | Somerton | 126/214 D |
| 5,474,055 | A * | 12/1995 | Kang | 126/39 R |
| 5,542,347 | A | 8/1996 | Joseph | |
| 5,678,531 | A | 10/1997 | Byers et al. | |
| 6,056,146 | A | 5/2000 | Varakian et al. | |
| 6,437,297 | B2 * | 8/2002 | Weiss et al. | 219/452.12 |
| 6,866,035 | B2 * | 3/2005 | Haemerle | 126/214 D |
| 6,973,927 | B1 | 12/2005 | Stewart | |
| 2005/0235981 | A1 * | 10/2005 | Mac | 126/39 R |
| 2007/0272629 | A1 * | 11/2007 | Spirer | 211/10 |

FOREIGN PATENT DOCUMENTS

CA 2090369 C 8/1997

OTHER PUBLICATIONS

American Griddle—picture Image downloaded and saved on Jul. 24, 2006.
Anets Golden Grill—manual gas grill data and price sheet Image downloaded and saved on Aug. 16, 2007.

(Continued)

*Primary Examiner* — Avinash Savani
(74) *Attorney, Agent, or Firm* — Russ Weinzimmer & Associates P.C.

(57) ABSTRACT

An apparatus for use with a commercial grill to increase safety, efficiency, and organization. The apparatus includes a barrier extending upwardly from the cooking surface, and extending along the backsplash of the grill, the barrier having an accessory staging feature along a topmost portion, the topmost portion being at least eight inches above the cooking surface. The accessory staging feature can support one or more accessories. The invention may thereby increase usable grill surface area. The apparatus can also include an attachment assembly for attaching the barrier to a standard backsplash, or the barrier can be an integral extension of the backsplash. The invention substantially reduces the likelihood of ventilation/exhaust well fires. The invention makes cleaning the factory backsplash much easier, because the backsplash is substantially protected from splatter by the invention. The invention substantially protects the stainless steel or tile kitchen back wall from splatter, smoke, grease, and soot.

20 Claims, 12 Drawing Sheets

(56) References Cited

OTHER PUBLICATIONS

Garland Flue Risers—Master Series High Shelves, Backguards and Flue Risers Image downloaded and saved on Aug. 16, 2007.
Hobart Griddle—picture Image downloaded and saved on Jul. 24, 2006.
MagiKitch'n Equipment—Equipment price list Image downloaded and saved on Jan. 3, 2005.
Sectional Flue Risers—product list Image downloaded and saved on Aug. 16, 2007.
Star-Max Manual Gas Griddles—features and benefits description Image downloaded and saved on Jul. 24, 2006.
Ultra Max Charbroilers—picture Image downloaded and saved on Jul. 24, 2006.
Vulcan Griddle—models and features description page Image downloaded and saved on Oct. 2003.
Wolf Griddle—picture Image downloaded and saved on Jul. 24, 2006.
Bakers Pride Model XSG-36—specifications and features of this model page Image downloaded and saved on Jul. 24, 2006.
Bakers Pride Model XOB-848—specifications and features of this model page Image downloaded and saved on Jul. 24, 2006.

* cited by examiner

BARRIER SYSTEM FOR ENHANCING THE SAFE OPERATION OF A COMMERCIAL COOKING APPLIANCE

FIELD OF THE INVENTION

This invention generally relates to commercial cooking equipment, and particularly to commercial griddles and charbroilers.

BACKGROUND OF THE INVENTION

A griddle or a charbroiler is often the first piece of equipment purchased for a new restaurant because it is an essential focal point for activity in the kitchen. Owners of restaurants, hotels, hospitals, military bases, cruise ships, colleges, etc all use a griddle or a charbroiler to cook many of their offerings.

Commercially available griddles and charbroilers provide a large cooking surface to efficiently cook food. However, after a prolonged period of cooking food on a griddle and/or a charbroiler, large quantities of ejectile food residue, including hot fat and oil splatter, and food particles, are produced. Such ejectile splatter and food residue lands in the ventilation well of a griddle and accumulates. With time, the air flow of the ventilation well dries the food residue, resulting in a dangerous potential for fire.

Commercially available griddles and charbroilers have a backsplash, typically rising no more than 6 inches above the cooking surface. Cleaning the backsplash at the end of each shift is essential to maintain a safe and professional-looking cooking environment. However, because food ejectile accumulating on the hot backsplash becomes very difficult to remove, one must get close to the backsplash to apply sufficient scrubbing force. Since a cooking surface takes several hours to sufficiently cool, cleaning the backsplash near the cooking surface is dangerous, since it's difficult to avoid coming into contact with the hot cooking surface.

Moreover, food and oil ejectile accumulates on the wall immediately behind the griddle or charbroiler. Such ejectile accumulation must be regularly cleaned. However, it is difficult to clean this accumulation with sufficient frequency to maintain a sanitary condition and a professional impression.

Also, grill cooks can benefit from cooking accessories such as a butter pan, or a sauce water bath. However, such cooking accessories are typically placed on the grill cooking surface, taking up valuable surface area intended for cooking food.

SUMMARY OF THE INVENTION

One general aspect of the invention is an apparatus for use with a commercial grill to increase safety, efficiency, and organization, the commercial grill having a cooking surface and a backsplash. The apparatus includes a barrier extending upwardly with respect to the cooking surface, and extending along the backsplash, the barrier having an accessory staging feature along a topmost portion, and the topmost portion being at least eight inches above the cooking surface.

In a preferred embodiment, the accessory staging feature has a cross-section shaped like an inverted squared "J".

In an alternate preferred embodiment, the accessory staging feature has a cross-section shaped like an inverted "L".

In yet another preferred embodiment, the accessory staging feature has a cross-section shaped like a straight vertical wall having a thin smooth flat top across which various accessories can move horizontally.

In a preferred embodiment, the apparatus also includes an attachment assembly, attached to the back of the barrier, and capable of attaching the barrier to the backsplash.

In another preferred embodiment, the topmost portion is no more than 17 inches above the cooking surface.

In other preferred embodiments, the attachment assembly can adapt to a variety of backsplash thicknesses.

In yet other preferred embodiments, the attachment assembly is removeably attached to the backsplash.

In preferred embodiments, the attachment assembly includes a plurality of attachment devices. In further preferred embodiments, each attachment device includes a track along which a plurality of clips are slidably attached.

In preferred embodiments, the barrier is made of stainless steel.

In some preferred embodiments, the apparatus further includes a side buttress. In further preferred embodiments, the side buttress is adjustable.

In other preferred embodiments, the apparatus further includes an adjustable side buttress having a top portion and a bottom portion. In further preferred embodiments, the adjustable side buttress is supported by a side splash guard of the grill. In other further preferred embodiments, the bottom portion of the side buttress is slideably cooperative with the top portion of the side buttress. In other further preferred embodiments, the top portion of the side buttress is secured in fixed relationship with the bottom portion so as to accommodate the height of the side splash guard.

Another general aspect of the invention is an apparatus for use with a commercial grill to increase safety, efficiency, and organization, the commercial grill having a cooking surface and a backsplash. The apparatus includes a barrier extending upwardly with respect to the cooking surface, and extending along the backsplash, the barrier including an accessory staging feature along a topmost portion, the topmost portion being at least 8 inches above the cooking surface; and an attachment assembly, attached to the back of the barrier, and capable of attaching the barrier to the backsplash.

In preferred embodiments, the topmost portion is no more than 17 inches above the cooking surface.

In other preferred embodiments, the apparatus further includes an adjustable side buttress having a top portion and a bottom portion, the adjustable side buttress being supported by a side splash guard of the grill.

The barrier of the invention is preferably made from stainless steel, and is easily attached to a standard factory backsplash. The invention substantially reduces the likelihood of ventilation/exhaust well fires. With the barrier of the invention mounted on a factory backsplash of a griddle or charbroiler, food items and oils on the cooking surface of the grill have substantially less chance of spattering into the exhaust well, thereby reducing the risk of fire as presently experienced with grills having only a standard factory backsplash. In addition, the invention makes cleaning the factory backsplash much easier, because the backsplash is substantially protected from splatter by the apparatus of the invention. Consequently, cleaning the factory backsplash is now safer and easier due to the invention.

Another feature of the invention is an accessory staging feature that is capable of supporting one or more accessories, such as a pan of grill butter, above the cooking surface of the grill. For example, the accessory staging feature supports the pan of grill butter high enough above the cooking surface to allow the area below the pan to be used for cooking, but still close enough to the cooking surface to keep the butter warm.

Keeping the butter pan off the cooking surface frees up more grill surface area, thereby allowing more food to be cooked on the grill at any one time.

The invention also substantially protects the stainless steel or tile kitchen back wall from splatter, smoke, grease, and soot.

The invention can also support a "warming drawer" attached under a shelf that is mounted on the accessory staging feature of the invention. The warming drawer can be used to hold and enclose meat that has already been cooked, but must be held in a warm state after cooking while other meats are being further cooked.

The shelf also supports a spatula, grill weights, and cooking tongs.

BRIEF DESCRIPTION OF THE DRAWINGS

The invention will be more fully understood by reference to the detailed description, in conjunction with the following figures, wherein.

DETAILED DESCRIPTION OF PREFERRED EMBODIMENTS

Figure 1:
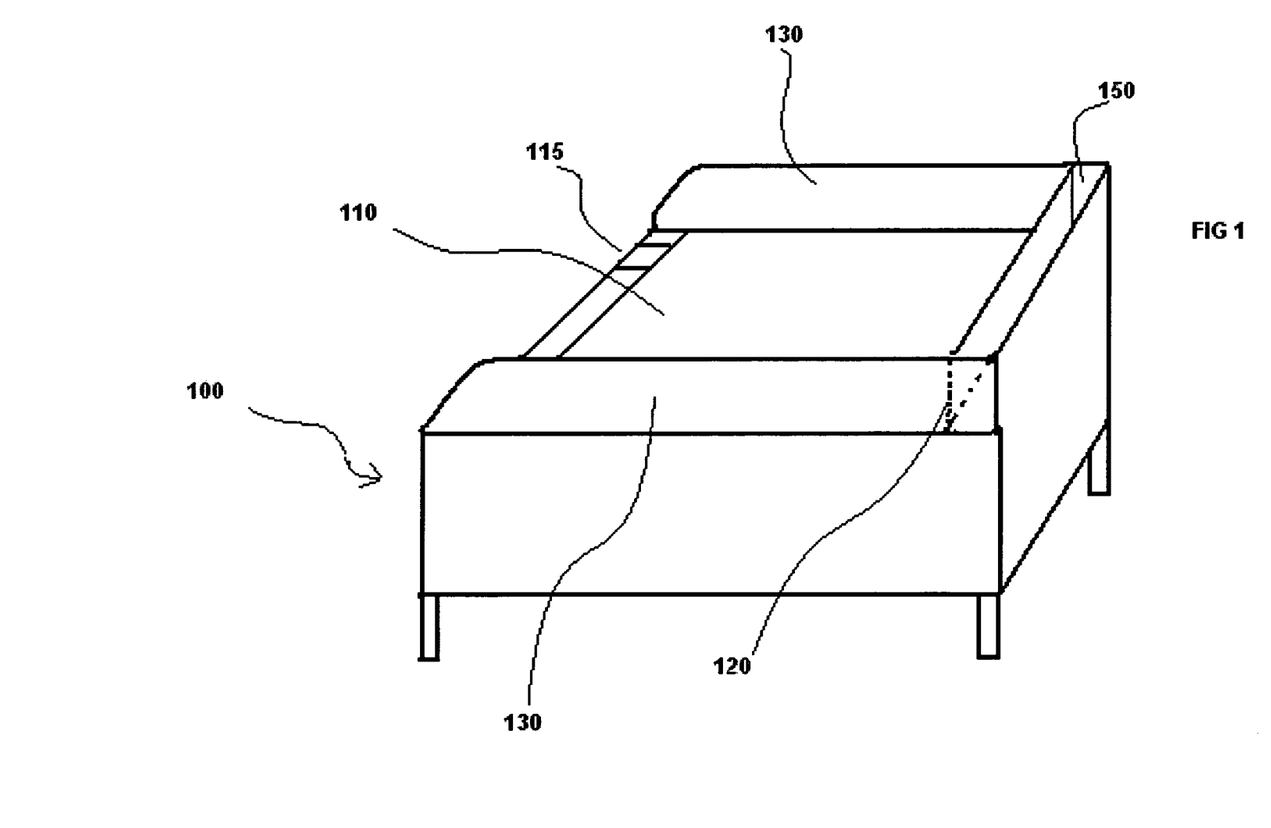
FIG. 1 is a rear corner isometric view of a prior art griddle having a backsplash and an exhaust well.

Referring to FIG. 1, a rear corner perspective view of a grill 100 with a cooking surface 110, a front 115, a backsplash 120, side walls 130, and an exhaust well 150, representative of that found in the prior art. The backsplash 120 functions as a barrier between the grill cooking surface 110 and the exhaust well 150. The backsplash 120 rises approximately four inches above the grill cooking surface 110, thereby preventing splatter from hitting the wall behind the grill, and preventing food items from being pushed into the exhaust well 150. Since a cook accesses the cooking surface 110 from the front 115 of the grill 100, the exhaust well 150 typically extends along the back edge of the cooking surface 110 so as to exhaust cooking fumes, vapors, smoke, and/or particulates away from the cook and away from the food being cooked. The backsplash 120 is integral with, or attached to, the rear portion of the cooking surface 110, the backsplash 120 separating the cooking surface 110 from the exhaust well 150.

The exhaust well 150 directs combustion fumes created by gas burners below the cooking surface 110 through the exhaust well 150 and up towards overhead exhaust vents (not shown). The overhead exhaust vents then remove the combustion fumes, along with any cooking fumes, from the general area of the grill 100. The interior surfaces of the exhaust well 150 become very hot due to the high temperatures of the hot gases flowing within the exhaust well 150. Consequently food items, cooking oils and the like, that fall into contact with the hot inner surfaces of the exhaust well 150, are likely to catch fire.

There are several ways food particles, oil splatter, and the like, can fall over the backsplash 120 and into the exhaust well 150. The most likely way is manipulation of food on the grill surface 110 near the backsplash 120. Cooks tend to handle food quickly, thereby creating food "ejectile" which can fly into the exhaust well 150. A scoop-and-lift motion often used by experienced cooks tends to launch food off the grill surface 110, adding to the likelihood of food entering the exhaust well 150.

Figure 2:
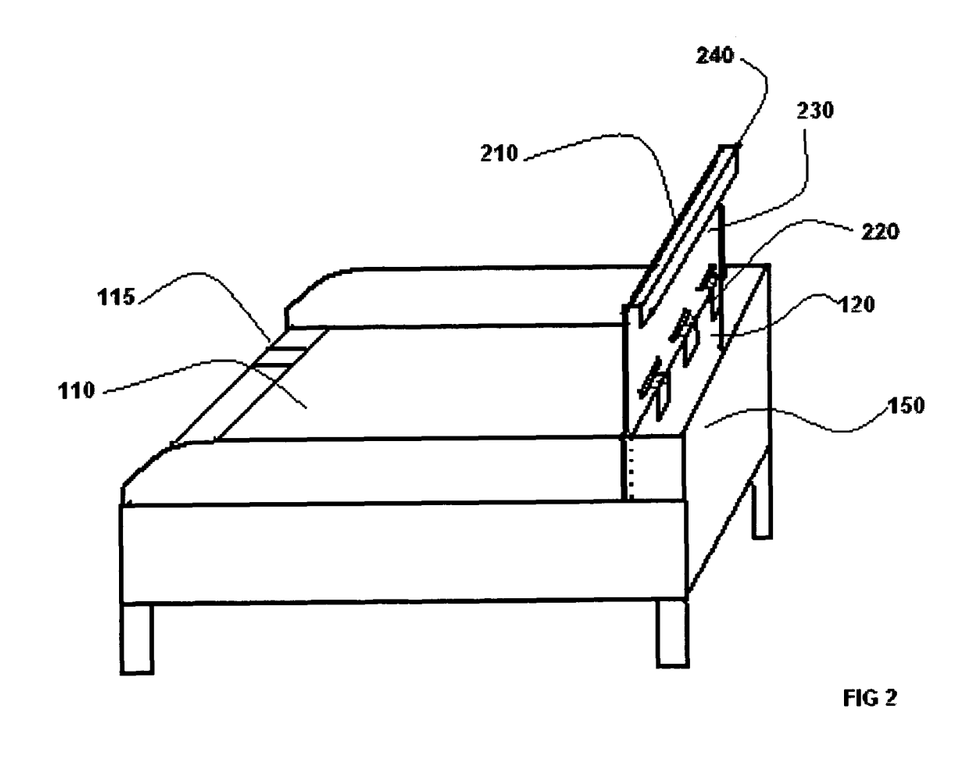
FIG. 2 is a rear corner isometric view of showing a preferred embodiment of the invention attached to the backsplash of FIG. 1.

Referring to FIG. 2, a preferred embodiment of the invention is shown in use with a typical grill. The barrier 210 of the invention is attached to the backsplash 120 so as to vertically extend the backsplash 120, thereby more effectively preventing food, oil splatter, and other ejectile originating from the surface 110 of the grill from entering the exhaust well 150. The barrier 210 can be attached to the backsplash 120 of any commercially available flat top griddle or charbroiler. In preferred embodiments, the barrier 210 includes retaining clips 220 that enable the barrier 210 to easily attach to the backsplash 120.

To attach the barrier 210 to the backsplash 120, the rear surface 230 of the barrier 210 is pressed against the front surface of the backsplash 120, and then urged downward until retaining clips 220 of the barrier 210 engage with the back of the backsplash 120. Retaining clips 220 can be for example spring clips that are either spring-loaded or they can be angled to create tension when displaced by the backsplash 120 to create spring-like tension.

The barrier 210 further includes an accessory staging feature 240, which in the preferred embodiment shown as an inverted squared "J". One advantage of the inverted squared "J" is to provide resistance to lateral bending of the barrier 210. In alternate embodiments, the accessory staging feature 240 can be shaped as an inverted "L", or simply as a straight vertical wall having a thin smooth flat top across which various accessories can move horizontally.

To function effectively in the high-temperature environment of a commercial griddle or charbroiler, the barrier 210 is preferably made of stainless steel. While other materials can be used, such as aluminum, cast iron, copper, and the like, they are more costly. Stainless steel is preferable also because it is easy to clean, and is commonly used in commercial kitchens. Stainless steel is also a readily available material which can be readily shaped into the various embodiments of the accessory staging feature 240.

Figure 3A:
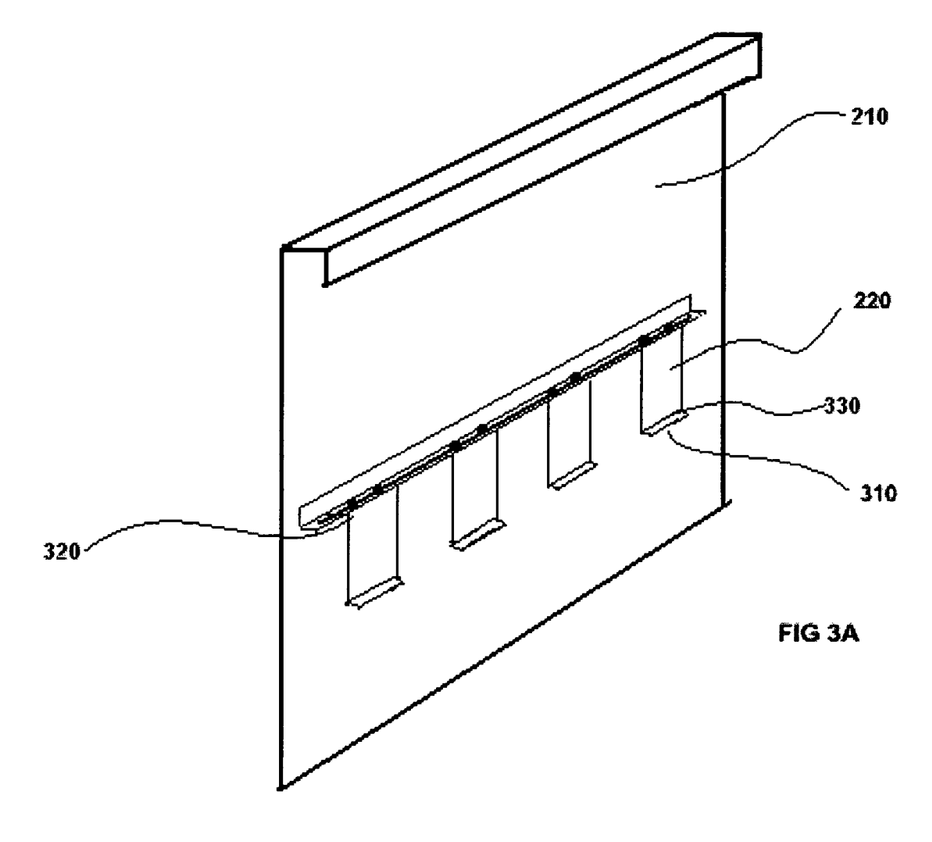
FIG. 3A is an isometric view of a plurality of adjustable retaining clips and a single-track embodiment for holding the barrier of the invention to the backsplash.

Referring to FIG. 3A, the retaining clips 220 are sized (e.g. 5× inches) and shaped to allow for easy and secure installation of the barrier 210 over various heights (e.g., up to a 5 inch backsplash) and thicknesses of the backsplash 120. The retaining clips 220 are formed into a modified "Z" shape having a guide toe 310 at a lower end angling away at 45 degrees from the barrier rear 230. The guide toe 320 allows the spring clip 240 to easily engage the top edge of the backsplash 120 during installation. In a preferred embodiment, the retaining clip 220 includes a 90 degree bend 320 and a 45 degree bend 330, such that the portion of the clip 220 between bends 320 and 330 extends straight downwards when engaged with the backsplash. After installation, the bend 330 contacts the backsplash 120, holding the barrier 210 in place with spring-like force created by the displacement of the retaining clip by the backsplash.

Figure 3B:
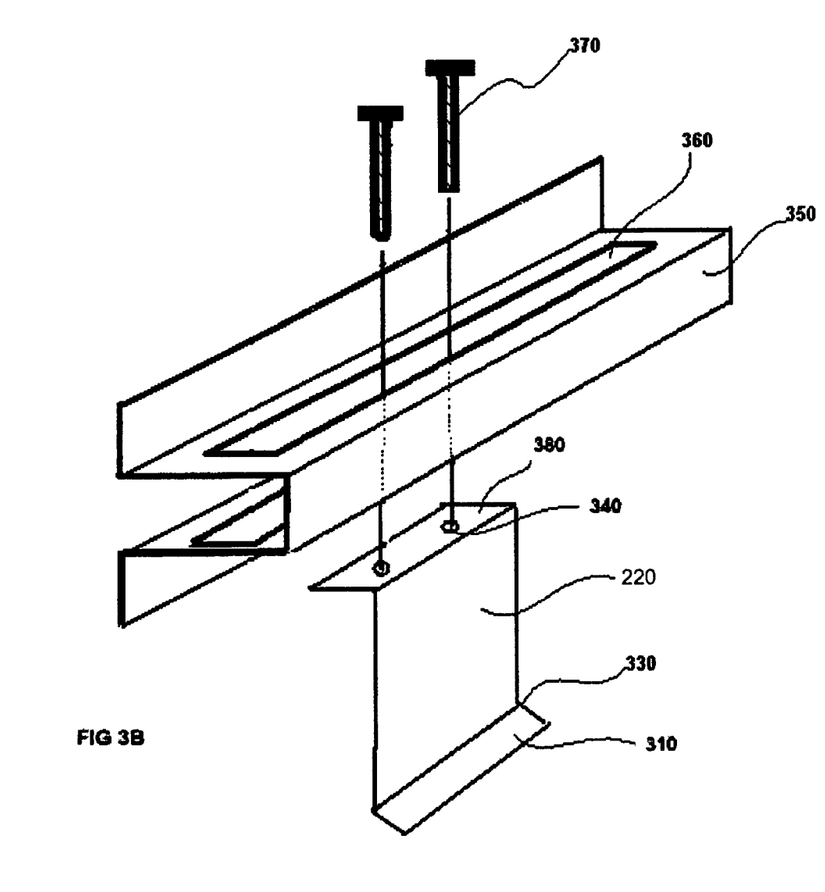
FIG. 3B is an isometric view of a reinforced track embodiment, and an exploded view showing how an adjustable retaining clip is attached to the reinforced track.

With reference to FIG. 3B, in this preferred embodiment, a plurality of separate tracks 350 can each support a retention clip 220 in slideable and adjustable relationship with a respective track 350. Embodiments can include from two to five tracks, for example, depending on the width of the grill. The track 350 in the embodiment of FIG. 3B is six inches wide, which allows the clips to be laterally positioned so as to avoid structural obstructions sometimes found within the exhaust vent of the grill. The clips 220 shown in FIG. 3A are attached in positions known to be free of such structural obstructions for a particular grill. By contrast, the clips of FIG. 3B can be adjustably positioned so as to adapt to a variety of grill models.

A track 350 includes a slot 360 through which bolts 370 can pass, thereby engaging with threaded holes 380 of the clip 220.

In this preferred embodiment, the track 350 is vertically positioned between two and seven inches above the base of the barrier 210, for example.

Figure 3C:
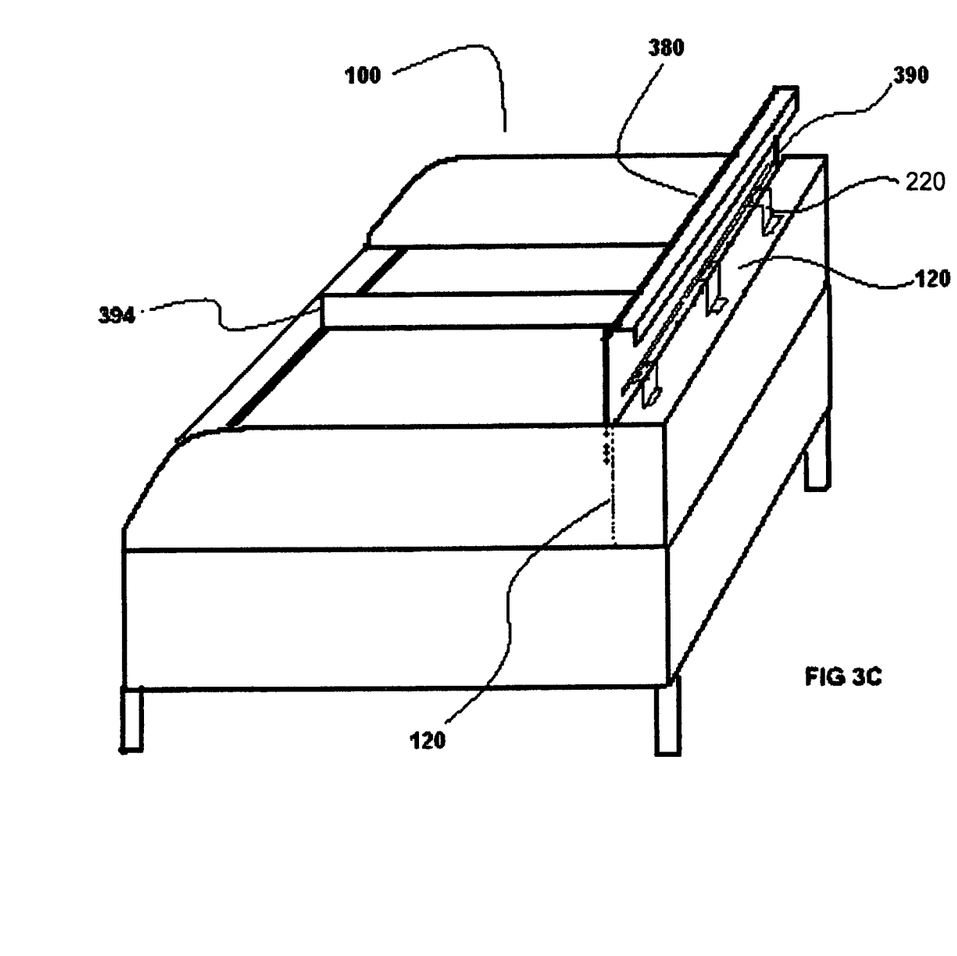
FIG. 3C is an isometric view showing a partial barrier sized to accommodate a grill partition, such as a partition between a griddle portion and a charbroil portion of a grill.

In the alternative embodiment, a barrier 380 is shown in FIG. 3C having a single attachment ledge 390, and five clips 220 securely attached thereto. The attachment ledge 390 is positioned approximately two inches above the base edge of the barrier 380. This allows the barrier 380 to be installed on a backsplash 120 of the grill 100, without impinging upon the grill divider 394.

Figure 4:
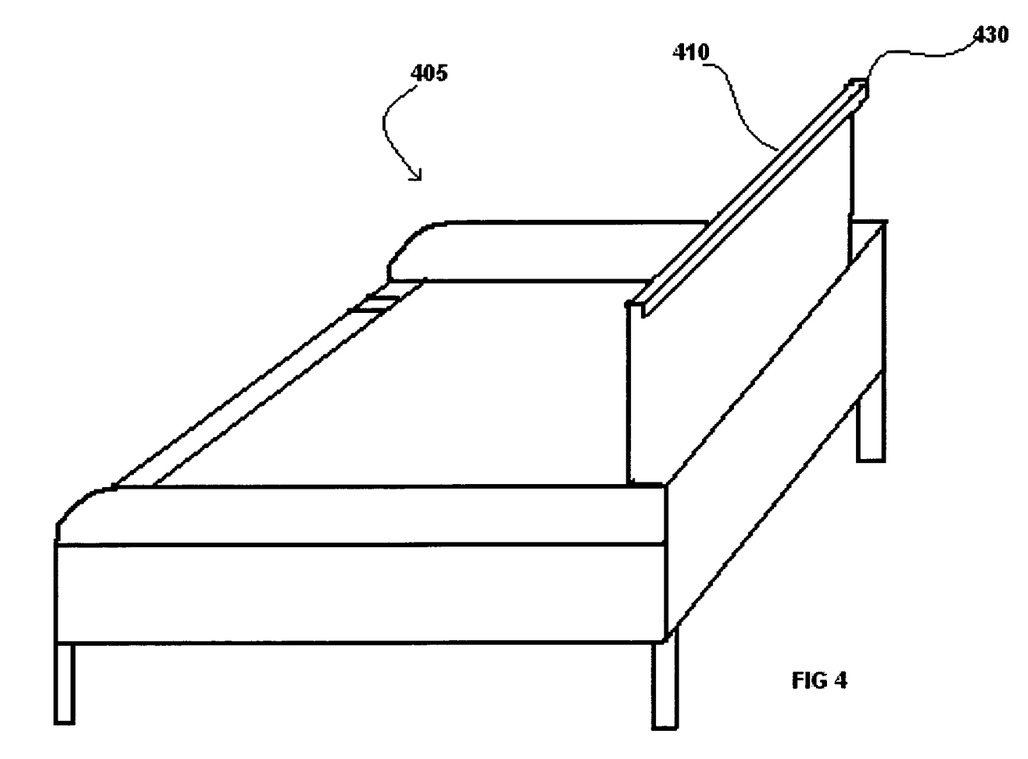
FIG. 4 is a preferred embodiment of the invention configured as an integral part of a griddle or char-broiler.

Referring to FIG. 4, a preferred embodiment of the barrier of the invention a grill or charbroiler 405 includes a barrier 410 configured as an integral part of the grill 405. The barrier 410 is an integral extension of the backsplash of the grill 405. Alternatively, the barrier 410 can be permanently attached to the backsplash of the grill 405, such as by welding, or by a nut and bold assembly.

The barrier 410 includes an accessory support portion 430, which in a preferred embodiment is shaped so as to structurally reinforce the portion 430. For example, the accessory support portion 430 can be shaped like an inverted "U", or it can be shaped like a "T", or like an inverted "L". In some embodiments, at least the accessory support portion is made from strengthened or thickened metal. The accessory support portion 430 is capable of receiving attachment of, and supporting, a variety of accessories, such as a butter pan holder, sauce pan holder, a shelf, a spice rack, a spatula holder, a warming drawer, grill weight holder, and any other accessory that would be helpful in using the grill.

Figure 5:
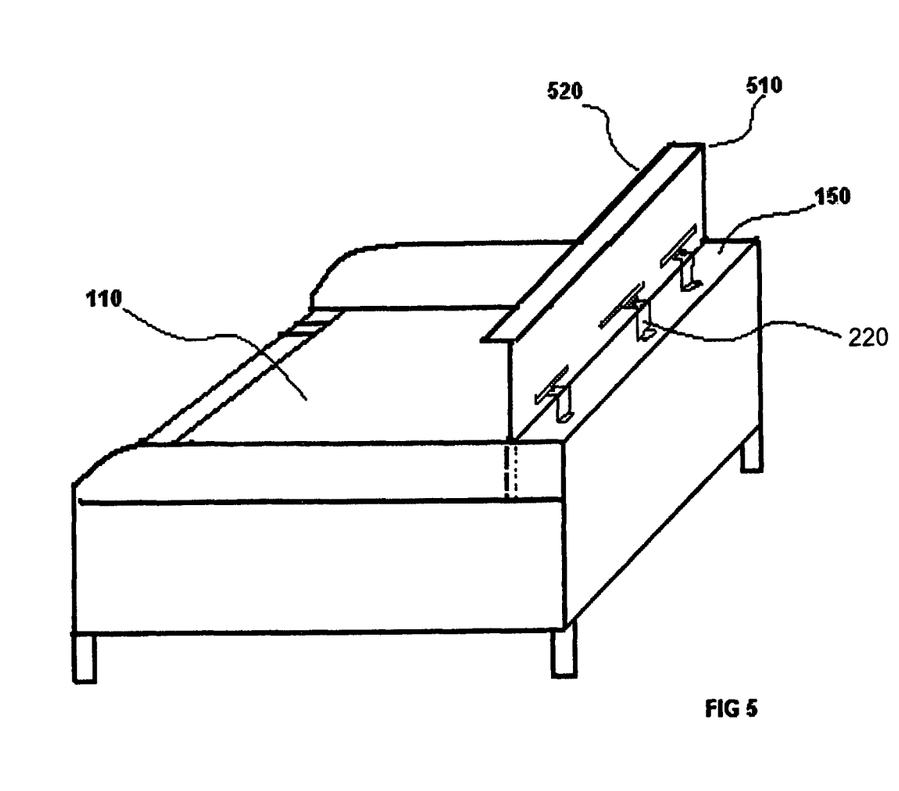
FIG. 5 is a rear corner isometric view of an alternate preferred embodiment of the barrier showing an inverted "L" shape accessory support portion.

Referring to FIG. 5, which is a rear corner perspective view of an alternate preferred embodiment of the invention, the barrier 510 may also be secured in place over an existing grill backsplash by the retaining clips 220. Rigidity for the barrier 510 is provided by a horizontal inverted "L" top 520 extending over the cooking surface 110.

Figure 6:
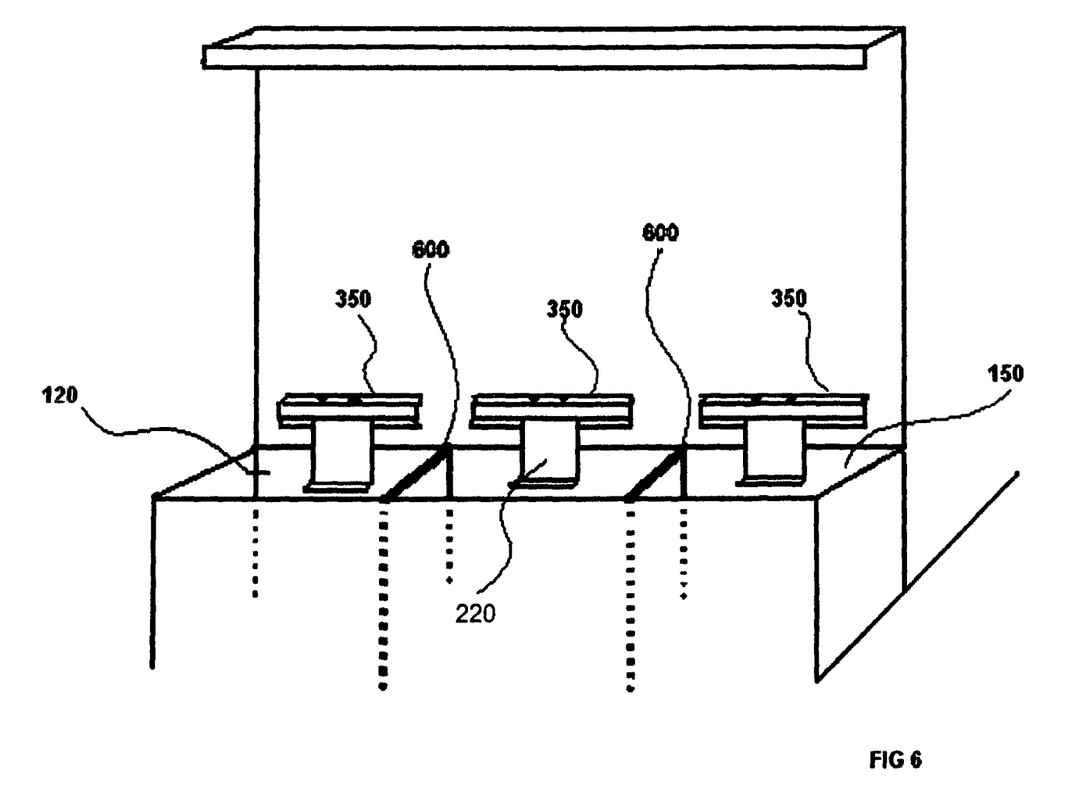
FIG. 6 is an isometric view of the rear of a grill, with a barrier of the invention secured in place by a plurality of clips, the position of each clip being adjustable using a respective track attached to the barrier.

The preferred embodiment of FIG. 5 is further illustrated in FIG. 6, where it can be seen that the combustion exhaust well 150 is maintained open by the vent support 600. A user installs retaining clips 220 using respective tracks 350, as described in FIG. 3C. The lateral position of the retaining clips 220 is determined so as to avoid the obstruction presented by the vent supports 600.

Figure 7:
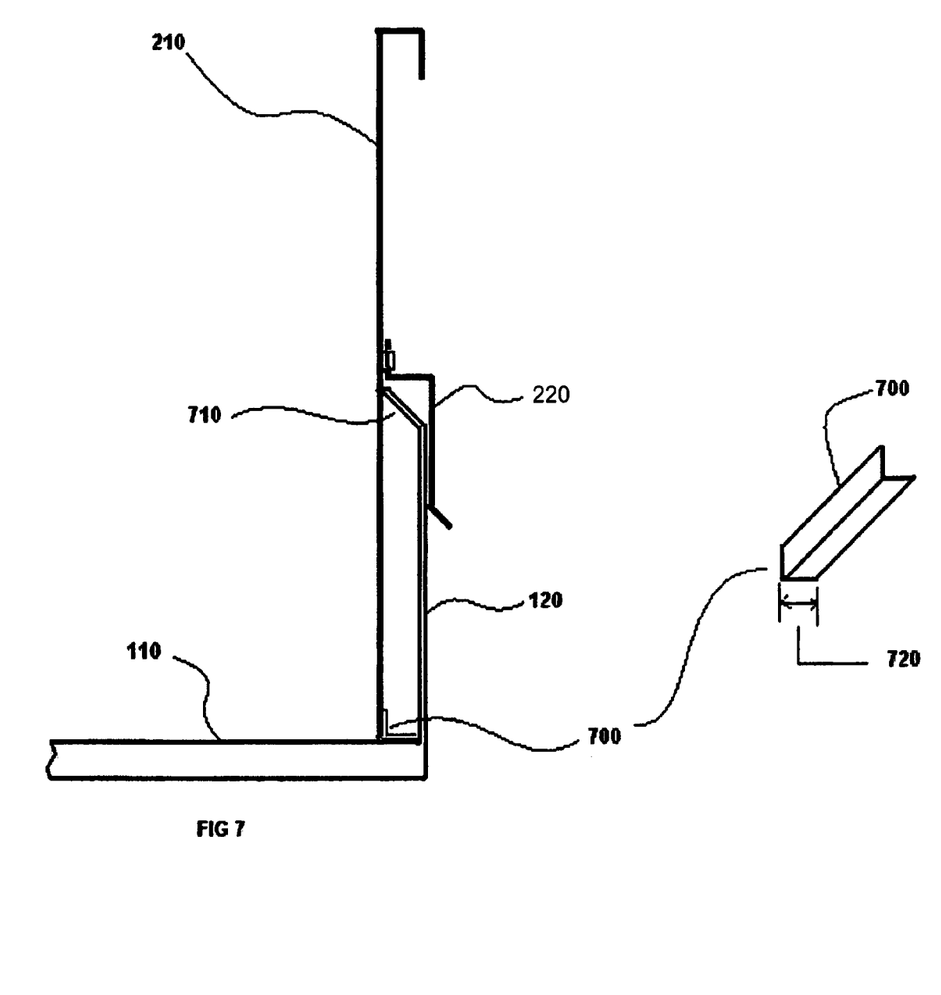
FIG. 7 is a side view of the barrier of the invention, showing how the barrier is clipped to a factory backsplash having a top portion that is bent forward, also employing a spacer.
Figure 8A:
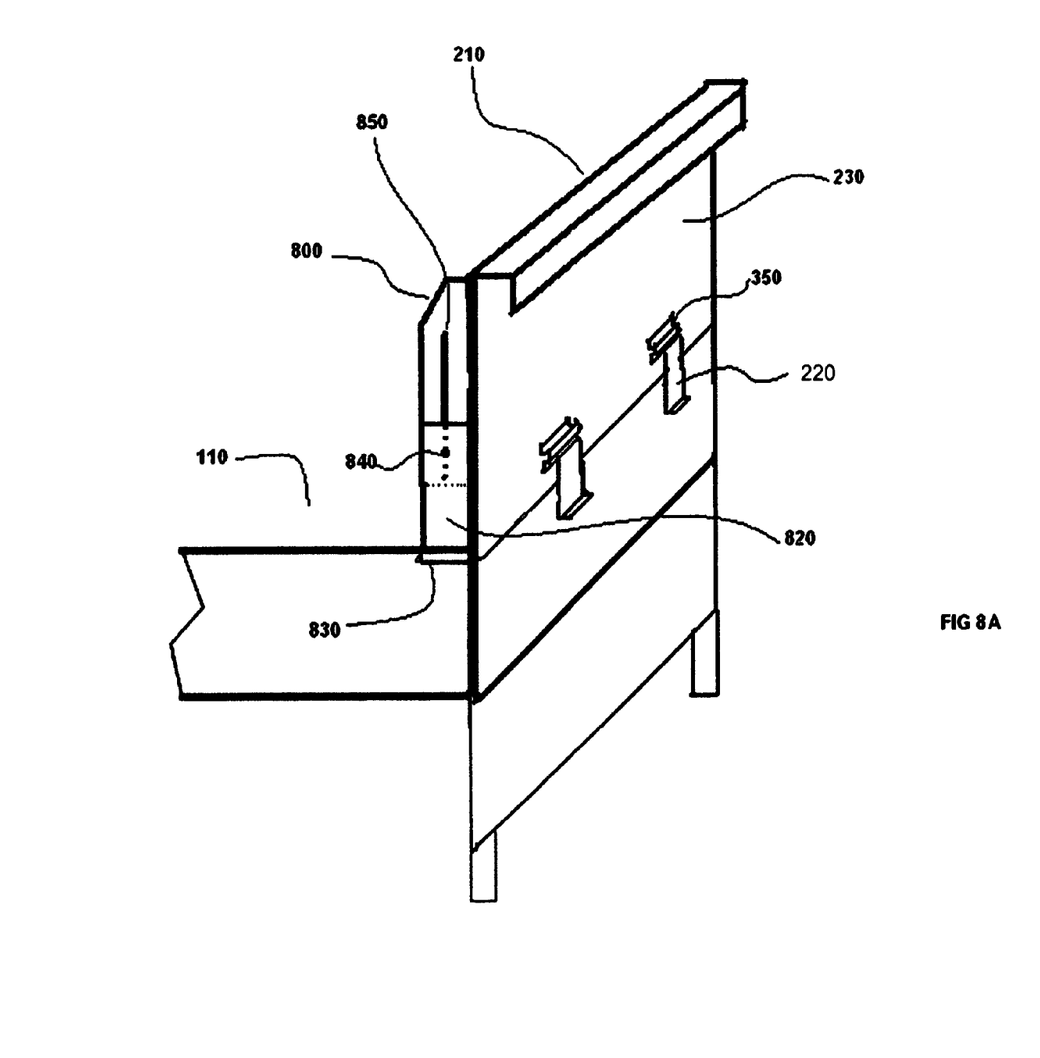
FIG. 8A is an isometric view of the barrier of the invention, also showing an adjustable side buttress having a top portion and a bottom portion, the top portion of the adjustable side buttress being attached to or integral with the barrier, and being supported by a side splash guard of the grill.

Referring to FIG. 7, a barrier 210 of the invention is clipped to a factory backsplash 120 using clips 220. The barrier 210 rests on the surface 110 of the grill 100, and is maintained in a substantially vertical position due to the placement of a spacer 700 that compensates for the forward displacement due to the forward bend 710. The width 720 of the spacer 700 is the same magnitude as the forward distance component of the forward bend 710. For example, the width 720 is half an inch FIG. 8A is an isometric view of the barrier 210 of the invention, also showing a side buttress having a top portion 800 and a bottom portion 820, the side buttress being attached to or integral with the barrier 210, and being supported via a bottom portion 820 by a side splash guard 130 of the grill 100. The top portion 800 of the side buttress is adjustably joined with the bottom portion 820. The bottom portion 820 has a base 830 which rests upon the side splash guard 130. The top portion 800 of the side buttress is adjustably cooperative with the bottom portion 820 via an adjustable fastener, such as a bolt assembly 840. The cooperation of the top portion 800 of the side buttress, the bottom portion 820, and the bolt assembly 840 serves to brace the barrier 210 against bending forward, especially when weight is placed at the top of the barrier, such as when the barrier 210 is used to support an accessory.

Figures 8B, 8C, 8D:
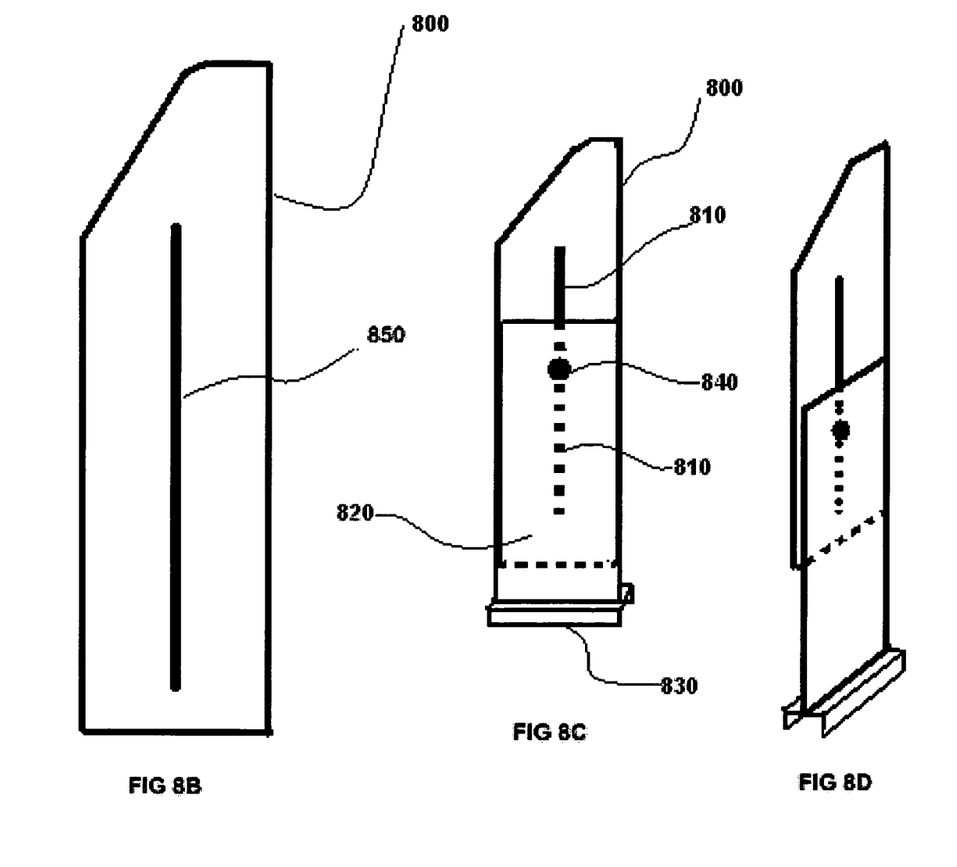
FIGS. 8B, 8C, 8D, and 8E respectively show the top portion of the side buttress of FIG. 8A, and three views of a bottom portion of the side buttress slideably cooperative with the top portion of the side buttress.

FIG. 8B shows the top portion 800 of the adjustable side buttress of FIG. 8A, the top portion 800 having a slot 850 for receiving the bolt assembly 840.

FIG. 8C shows a first view of the top portion 800 slideably cooperative with the bottom portion 820 of the adjustable side buttress, also showing the slot 850, the bolt assembly 840 inserted therethrough, and the base 830 which rests upon the side splash guard 130.

Figure 8E:
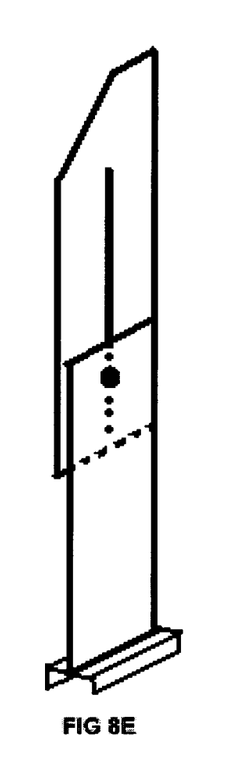

FIGS. 8D and 8E shows second and third views of the top portion 800 and the bottom portion 820 in different states of adjustment so as to accommodate respective side splash guards 130 of different heights. For example, sliding the bottom portion 820 downward accommodates a relatively shorter side splash guard 130.

Figures 8F, 8G:
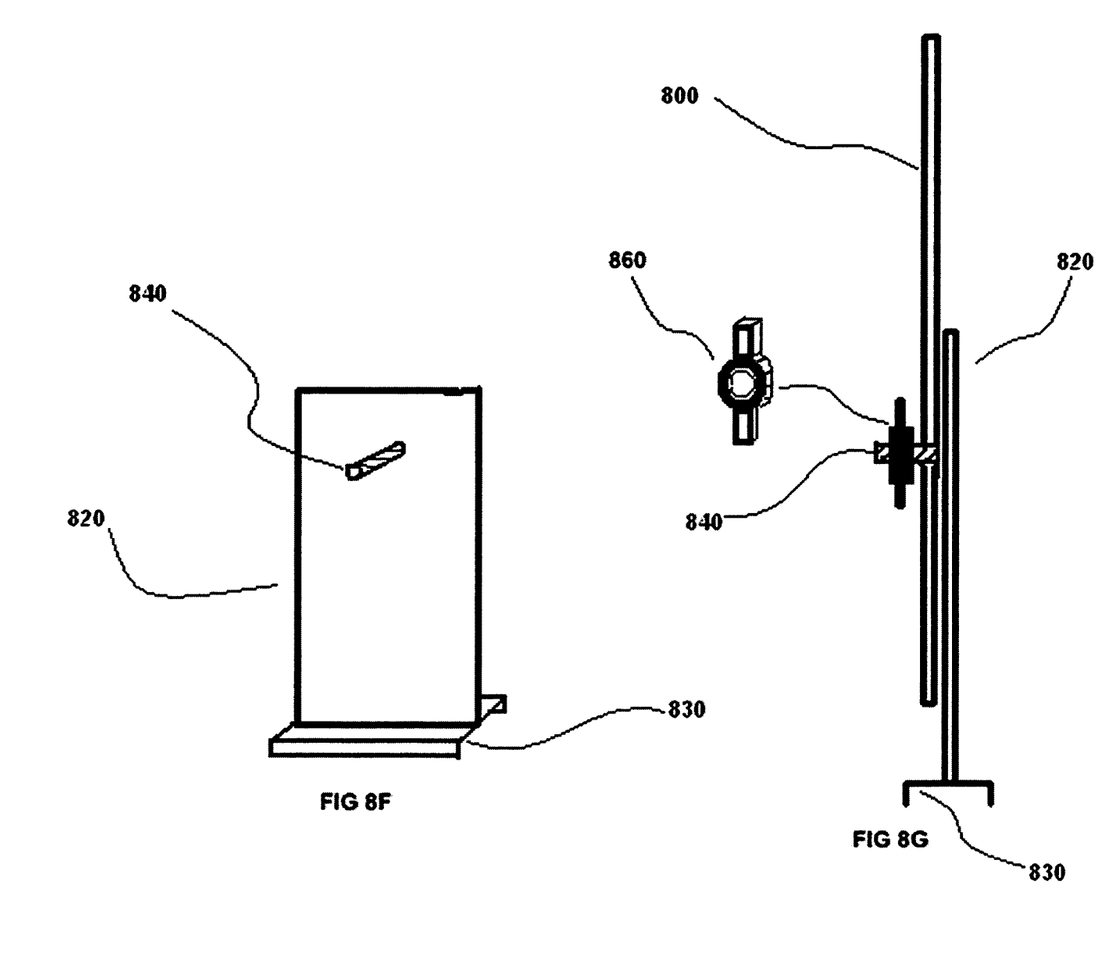
FIGS. 8F and 8G respectively show a side view of the bottom portion, and a front view of how the top portion of the side buttress can be secured in fixed relationship with the bottom portion after being properly adjusted to accommodate the height of the side splash guard.

FIG. 8F shows the bottom portion 820, having the base 830, and a bolt 840 of the bolt assembly.

FIG. 8G shows a side view illustrating how the wing nut 860 attaches to the bolt 840 of the bolt assembly to tighten the top portion 800 of the side buttress against the bottom portion 820 of the side buttress so as to allow the base 830 to rest in supporting relationship with the side splash guard 130. Thus, the bottom portion 820 can be secured in fixed relationship with the top portion 800 of the adjustable side buttress after being properly adjusted to accommodate the height of the side splash guard.

Other modifications and implementations will occur to those skilled in the art without departing from the spirit and the scope of the invention as claimed. Accordingly, the above description is not intended to limit the invention except as indicated in the following claims.

What is claimed is:

1. A barrier system for enhancing the safe operation of a commercial cooking appliance, the commercial cooking appliance having one or more burners disposed beneath an open cooking surface, the one or more burners used to heat the open cooking surface to an appropriate temperature for cooking thereon, the commercial cooking appliance including an exhaust well running the length of a back side of the cooking surface through which waste heat and waste gas produced by the burners is vented from beneath the cooking surface, the exhaust well including a backsplash that forms a front wall of the exhaust well, the backsplash extending in an upwardly direction along the back end of the cooking surface to a first height above the cooking surface, the barrier system comprising:
   a barrier member configured to be coupled to the backsplash of the commercial cooking appliance so that it extends upwardly to a second height above the cooking surface that is substantially greater than the first height of the backsplash above the cooking surface, the barrier member having a length that extends substantially along the entire length of the exhaust well and back side of the cooking surface; and
   an attachment assembly comprising at least one retaining clip, the attachment assembly affixed to the back of the barrier member and capable of coupling the barrier member to the backsplash to create a continuous extension of the backsplash whereby the barrier member is supported against rotation-to maintain the barrier member in its upward orientation; and
   an accessory staging feature extending along a length of a topmost portion of the barrier member, the accessory staging feature having a cross-section shaped like an inverted squared "J".

2. The barrier system of claim 1, wherein the accessory staging feature has a cross-section shaped like an inverted "L".

3. The barrier system of claim 1, wherein the accessory staging feature has a cross-section shaped like a straight vertical wall having a thin smooth flat top across which various accessories can move horizontally.

4. The barrier system of claim 1, wherein the at least one retaining clip of the attachment assembly is a spring clip having a receiving end configured to receive and then squeeze the backsplash between the barrier member and the attachment assembly by spring-like compression.

5. The barrier system of claim 1, wherein the attachment assembly can adapt to a range of backsplash thicknesses.

6. The barrier system of claim 1, wherein the attachment assembly is configured to removably couple the barrier member to the backsplash so that said barrier system can be easily removed from the backsplash for cleaning, by hand and without use of tools.

7. The barrier system of claim 4, wherein the attachment assembly includes a plurality of the spring clips.

8. The barrier system of claim 7, wherein the attachment assembly includes at least one track, running substantially in parallel with the backsplash, within which at least one of the plurality of spring clips is are slideably disposed.

9. The barrier system of claim 1, wherein the barrier member is made of stainless steel.

10. The barrier system of claim 1, wherein:
   the commercial cooking appliance includes side splashes disposed along the sides of the cooking surface perpendicular to the backsplash; and
   said barrier system further includes an adjustable side buttress disposed at each end of the barrier member so that each adjustable side buttress rests on the side splashes for additional rotational support when said barrier system is attached thereto.

11. The barrier system of claim 10, wherein each of the adjustable side buttresses has a top portion and a bottom portion, the bottom portion of each resting on one of the side splashes and the top portion of each capable of being slideably raised or lowered relative to the bottom portion of each side buttress in accordance with the height of each side splash, the top portion of each side buttress capable of being fixed in position relative to the bottom portion of each side buttress once the adjustment is complete.

12. The barrier system of claim 4, wherein the receiving end of the at least one spring clip has a toe portion that bends away from the back splash to aid in receiving the backsplash, and makes squeezing contact with the backsplash at the bend.

13. The barrier system of claim 1, wherein the second height is at least 8 inches above the cooking surface.

14. The barrier system of claim 1, further comprising a spacer disposed at a bottom end of the barrier member, the spacer configured to maintain the barrier member in a substantially vertical orientation when the barrier member is coupled to the backsplash such that the bottom end is in contact with and supported by the commercial cooking appliance, the spacer capable of displacing the lower end of the barrier member away from the backsplash sufficiently to compensate for any forward displacement of the barrier member at the top of the backsplash.

15. A barrier system for enhancing the safe operation of a commercial cooking appliance, the commercial cooking appliance having one or more burners disposed beneath an open cooking surface, the one or more burners used to heat the open cooking surface to an appropriate temperature for cooking thereon, the commercial cooking appliance including an exhaust well running the length of a back side of the cooking surface through which waste heat and waste gas produced by the burners is vented from beneath the cooking surface, the exhaust well including a backsplash that forms a front wall of the exhaust well, the backsplash extending in an upwardly direction along the back end of the cooking surface to a first height above the cooking surface, the barrier system comprising:
   a barrier member configured to be coupled to the backsplash of the commercial cooking appliance so that it extends upwardly to a second height above the cooking surface that is substantially greater than the first height of the backsplash above the cooking surface, the barrier member having a length that extends substantially along the entire length of the exhaust well and back side of the cooking surface;
   an attachment assembly comprising at least one retaining clip, the attachment assembly affixed to the back of the barrier member and capable of coupling the barrier member to the backsplash to create a continuous extension of the backsplash whereby the barrier member is supported against rotation-to maintain the barrier member in its upward orientation; and
   a spacer disposed at a bottom end of the barrier member, the spacer configured to maintain the barrier member in a substantially vertical orientation when the barrier member is coupled to the backsplash such that the bottom end is in contact with and supported by the commercial cooking appliance, the spacer capable of displacing the lower end of the barrier member away from the backsplash sufficiently to compensate for any forward displacement of the barrier member at the top of the backsplash.

16. A barrier system for enhancing the safe operation of a commercial cooking appliance, the commercial cooking appliance having one or more burners disposed beneath an open cooking surface, the one or more burners used to heat the open cooking surface to an appropriate temperature for cooking thereon, the commercial cooking appliance including an exhaust well running the length of a back side of the cooking surface through which waste heat and waste gas produced by the burners is vented from beneath the cooking surface, the exhaust well including a backsplash that forms a front wall of the exhaust well, the backsplash extending in an upwardly direction along the back end of the cooking surface to a first height above the cooking surface, the barrier system comprising:

- a barrier member configured to be coupled to the backsplash of the commercial cooking appliance so that it extends upwardly to a second height above the cooking surface that is substantially greater than the first height of the backsplash above the cooking surface, the barrier member having a length that extends substantially along the entire length of the exhaust well and back side of the cooking surface; and
- an attachment assembly comprising at least one retaining clip, the attachment assembly affixed to the back of the barrier member and capable of coupling the barrier member to the backsplash to create a continuous extension of the backsplash whereby the barrier member is supported against rotation-to maintain the barrier member in its upward orientation,
- wherein the at least one retaining clip of the attachment assembly is a spring clip having a receiving end configured to receive and then squeeze the backsplash between the barrier member and the attachment assembly by spring-like compression.

17. The barrier system of claim 16, wherein the receiving end of the at least one spring clip has a toe portion that bends away from the back splash to aid in receiving the backsplash, and makes squeezing contact with the backsplash at the bend.

18. The barrier system of claim 16, wherein:
the attachment assembly includes a plurality of the spring clips; and
the attachment assembly includes at least one track, running substantially in parallel with the backsplash, within which at least one of the plurality of spring clips is are slideably disposed.

19. A barrier system for enhancing the safe operation of a commercial cooking appliance, the commercial cooking appliance having one or more burners disposed beneath an open cooking surface, the one or more burners used to heat the open cooking surface to an appropriate temperature for cooking thereon, the commercial cooking appliance including an exhaust well running the length of a back side of the cooking surface through which waste heat and waste gas produced by the burners is vented from beneath the cooking surface, the exhaust well including a backsplash that forms a front wall of the exhaust well, the backsplash extending in an upwardly direction along the back end of the cooking surface to a first height above the cooking surface, the barrier system comprising:

- a barrier member configured to be coupled to the backsplash of the commercial cooking appliance so that it extends upwardly to a second height above the cooking surface that is substantially greater than the first height of the backsplash above the cooking surface, the barrier member having a length that extends substantially along the entire length of the exhaust well and back side of the cooking surface; and
- an attachment assembly comprising at least one retaining clip, the attachment assembly affixed to the back of the barrier member and capable of coupling the barrier member to the backsplash to create a continuous extension of the backsplash whereby the barrier member is supported against rotation to maintain the barrier member in its upward orientation,
- wherein the commercial cooking appliance includes side splashes disposed along the sides of the cooking surface perpendicular to the backsplash, and
- wherein said barrier system includes an adjustable side buttress disposed at each end of the barrier member so that each adjustable side buttress rests on the side splashes for additional rotational support when said barrier system is attached thereto.

20. The barrier system of claim 19, wherein each of the adjustable side buttresses has a top portion and a bottom portion, the bottom portion of each resting on one of the side splashes and the top portion of each capable of being slideably raised or lowered relative to the bottom portion of each side buttress in accordance with the height of each side splash, the top portion of each side buttress capable of being fixed in position relative to the bottom portion of each side buttress once the adjustment is complete.

* * * * *